(12) United States Patent
Braun

(10) Patent No.: US 7,797,247 B2
(45) Date of Patent: Sep. 14, 2010

(54) METHOD FOR OPTIMIZING THE PERFORMANCE OF A NETWORKED MAIL PROCESSING SYSTEM

(75) Inventor: John F. Braun, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 225 days.

(21) Appl. No.: 11/832,935

(22) Filed: Aug. 2, 2007

(65) Prior Publication Data

US 2009/0037338 A1      Feb. 5, 2009

(51) Int. Cl.
*G06Q 50/00* (2006.01)
(52) U.S. Cl. .............................. 705/60; 705/51; 705/59; 705/62; 380/23; 380/24; 380/25
(58) Field of Classification Search ................... 705/51, 705/59, 60, 62; 380/23, 24, 25
See application file for complete search history.

(56) References Cited

U.S. PATENT DOCUMENTS

| | | | |
|---|---|---|---|
| 6,098,058 A | 8/2000 | Gravell et al. | |
| 7,136,839 B2 * | 11/2006 | Lee et al. | 705/60 |
| 2007/0239620 A1 * | 10/2007 | Schwartz et al. | 705/62 |

* cited by examiner

*Primary Examiner*—Pierre Eddy Elisca
*Assistant Examiner*—Shahid Kamal
(74) *Attorney, Agent, or Firm*—Brian A. Lemm; Angelo N. Chaclas

(57) ABSTRACT

A method of optimizing the performance of a networked mailing system having a plurality of metering systems includes determining in a first metering system that a cryptographic operation needs to be performed, and identifying a device coupled to the network that can perform the cryptographic operation faster than the first metering system. If a device has been so identified, the method further includes sending a request to the identified device to perform the cryptographic operation. If the request has been sent, the method includes receiving a response including processed data in the first metering system from the device. The processed data includes a result of the cryptographic operation being performed on the piece of data in question.

21 Claims, 6 Drawing Sheets

```
0001FEC7420030320025000012F33101541900000000000000000000000318F78000000000000D30A
CF5ED4650A730FC56738B70514D738EO402BCE5C5A0BCDFC397818F20DC60767D3640AE2DC3C
```

| | |
|---|---|
| INDICIA VERSION NUMBER : | 00 |
| ALGORITHM ID : | 01 |
| CERTIFICATE SERIAL # : | 4376574 |
| PSD MANUFACTURER ID : | 02 |
| PSD MODEL ID : | 1P |
| PSD SERIAL NUMBER : | 0002546972 |
| ASCENDING REGISTER : | 000000080.137 |
| POSTAGE : | 00.037 |
| DATE OF MAILING : | 2005 07 06 |
| LICENSING ZIP CODE : | 06484 |
| RESERVED FIELD 1 : | 0000000000 |
| SOFTWARE ID : | 000000000031 |
| DESCENDING REGISTER : | 000000030. 863 |
| RATE CATEGORY : | |

0001FEC7420030320025000012F331015419000000000000000000318F780000000000000D30A
CF5ED4650A730FC56738B70514D738E0402BCE5C5A0BCDFC397818F20DC60767D3640AE2DC3C

FIG. 2A

INDICIA VERSION NUMBER : 00
ALGORITHM ID : 01
CERTIFICATE SERIAL # : 4376574
PSD MANUFACTURER ID : 02
PSD MODEL ID : 1P
PSD SERIAL NUMBER : 0002546972
ASCENDING REGISTER : 000000080.137
POSTAGE : 00.037
DATE OF MAILING : 2005 07 06
LICENSING ZIP CODE : 06484
RESERVED FIELD 1 : 0000000000
SOFTWARE ID : 00000000031
DESCENDING REGISTER : 000000030.863
RATE CATEGORY :

FIG. 2B

DIGITAL SIGNATURE DSA: 2B40E038D71405B73867C50F730A65D45ECF0AD33CDCE20A64D36707C60DF
21878397CCD0B5A5CCE

FIG. 2C

| 40 | COMMAND CODE | REQUEST FOR ABILITIES |
|---|---|---|
| 45 | SOURCE IP ADDRESS | X.X.X.X |
| | DIGITAL SIGNATURE | BYTE ARRAY |

| | | 50 |
|---|---|---|
| | COMMAND CODE | REQUEST FOR ABILITIES RESPONSE |
| 55 | SOURCE IP ADDRESS | X.X.X.X |
| 60 | DESTINATION IP ADDRESS | Y.Y.Y.Y |
| 65 | NUMBER OF ALGORITHMS | Z |
| 70 | ALGORITHM 1 | ALGORITHM 1 NAME |
| 75 | ALGORITHM 1 STRENGTH (BITS) | ALGORITHM 1 BITS |
| 80 | ALGORITHM 1 PERFORMANCE (BYTES/SECOND) | ALGORITHM 1 RATE |
| 70 | ALGORITHM Z | ALGORITHM Z NAME |
| 75 | ALGORITHM Z STRENGTH (BITS) | ALGORITHM Z BITS |
| 80 | ALGORITHM Z PERFORMANCE (BYTES/SECOND) | ALGORITHM Z RATE |
| 85 | DIGITAL SIGNATURE | BYTE ARRAY |

| IP ADDRESS | ALGORITHM TYPE | ALGORITHM STRENGTH (BITS) | ALGORITHM PERFORMANCE (BYTES/SECOND) | PROCESS LOAD (%) |
|---|---|---|---|---|
| X.X.X.X | AES | 128 | Yyy | G |
| X.X.X.X | AES | 192 | Zzz | O |
| a.a.a.a | AES | 128 | Ccc | O |
| a.a.a.a | AES | 256 | Ddd | H |
| SELF | AES | 128 | Eee | I |
| SELF | AES | 192 | Fff | J |

FIG. 5

| COMMAND CODE | DISTRIBUTED CRYPTO REQUEST |
|---|---|
| SOURCE IP ADDRESS | X.X.X.X |
| DESTINATION IP ADDRESS | Y.Y.Y.Y |
| ALGORITHM TYPE | Aaa |
| ALGORITHM STRENGTH | Bbb |
| KEY ID | KEY ID |
| KEY LENGTH | Ccc |
| KEY DATA | BYTE ARRAY(ccc) |
| KEY LENGTH | Ddd |
| DATA | BYTE ARRAY(ddd) |
| DIGITAL SIGNATURE | BYTE ARRAY |

FIG. 6

| COMMAND CODE | DISTRIBUTED CRYPTO REQUEST RESPONSE |
|---|---|
| STATUS | FAILURE CODE |

FIG. 7

| COMMAND CODE | DISTRIBUTED CRYPTO REQUEST RESPONSE |
|---|---|
| STATUS | SUCCESS |
| SOURCE IP ADDRESS | X.X.X.X |
| DESTINATION IP ADDRESS | Y.Y.Y.Y |
| ALGORITHM TYPE | Aaa |
| ALGORITHM STRENGTH | Bbb |
| PROCESSED DATA LENGTH | Ccc |
| PROCESSED DATA | BYTE ARRAY(ccc) |
| PROCESSED LOAD (PERCENT) | Zz% |

FIG. 8

METHOD FOR OPTIMIZING THE PERFORMANCE OF A NETWORKED MAIL PROCESSING SYSTEM

FIELD OF THE INVENTION

The invention disclosed herein relates generally to mail processing systems, and more particularly to a method for optimizing the performance of a mail processing system having a plurality of postage metering systems coupled to a network by selectively offloading cryptographic operations to other devices coupled to the network.

BACKGROUND OF THE INVENTION

Postage metering systems are well known in the art. A postage metering system applies evidence of postage, commonly referred to as postal indicia, to envelopes or other mailpieces and accounts for the value of the postage dispensed. A typical postage metering system includes a postal security device (PSD) coupled to a host system. The PSD is a secure processor-based accounting device that dispenses and accounts for postage value stored therein. PSDs also typically include cryptographic capabilities so that they are able to print postal indicia in a secure, verifiable manner and engage in other secure communications and transactions. The host system may be, for example, a meter-based host processor or a personal computer that includes a printing capability. In many instances, mailers employ multiple postage metering systems in order to processes large volumes of mail, possibly at multiple locations.

Over time, postage metering systems, and in particular PSDs, have evolved to meet the needs of both mailers and postal authorities through the introduction of more sophisticated and faster networking capabilities, faster and more capable processors, and more powerful cryptographic algorithms. In many cases, mailers accumulate a number of postage metering systems and/or devices, such as mailing machines, that employ postage metering systems with varying levels of networking capabilities, processing powers and/or cryptographic algorithms. As will be appreciated, in some cases a particular postage metering system, and specifically a particular PSD thereof, may not have the ability to perform one or more required cryptographic operations due to resource or design limitations or may be able to perform the required operation but at a slower (relative to other devices of the mailer) rate.

Thus, with the advances in networking technology that exist, such as gigabit Ethernet, it would be advantageous to be able to offload certain cryptographic processing from one postage metering system to another device, such as, for example, in the case where a first postage metering system does not have the ability to perform the operation but a second postage metering system does, or in the case where the first postage metering has the ability to perform the operation but the second postage metering system can do it faster.

SUMMARY OF THE INVENTION

In one embodiment, the invention provides a method of optimizing the performance of a mailing system having a plurality of postage metering systems operatively coupled to a network, wherein each of the postage metering systems includes a postal security device. The method includes determining in a first postage metering system that a cryptographic operation associated with generating a postal indicium needs to be performed on a piece of data, and determining if there is a device that is coupled to the network, e.g., another postage metering system or processing device, that can perform the cryptographic operation on the piece of data faster than the first postage metering system can perform the cryptographic operation on the piece of data. If such a device is coupled to the network, the device is identified, and the method further includes sending a request through the network to the identified device to perform the cryptographic operation on the piece of data. The request in this step includes at least the piece of data. If the request has been sent, the method includes receiving a response including processed data in the postage metering system through the network from the identified device. The processed data includes a result of the cryptographic operation being performed on the piece of data. The request may further include at least one key for use in performing the cryptographic operation, in which case the request is preferably encrypted in a manner wherein the encrypted request can be decrypted using one or more stored keys stored by the identified device. The request may also further include an identification of the algorithm and algorithm strength to be used in performing the cryptographic operation. Accounting for the postal indicium occurs locally in the first postage metering system, and the processed data is used by the first postage metering system to complete the postal indicium.

In one particular embodiment, the method further includes steps of determining whether the first postage metering system can perform the cryptographic operation on the piece of data, and if it is determined that the first postage metering system can perform the cryptographic operation on the piece of data and if one or more devices other than the first postage metering systems has not been identified (i.e., none of them is the fastest) in the determining step, performing the cryptographic operation on the piece of data using the first postage metering system.

The method may further include requesting and receiving through the network in the first postage metering system information relating to the performance capabilities of each device coupled to the network and storing the information. Furthermore, the step of storing the information may include generating and storing a table that includes for each of the devices the information relating to the performance capabilities of the device and a corresponding identifier for the device. The table further includes information relating to the performance capabilities of the first postage metering system. The information relating to the performance capabilities of each device may include, for each device, algorithm information relating to one or more reported algorithms supported by the device. The algorithm information for each of the reported algorithms may include the name of the reported algorithm, the bit strength of the reported algorithm, and the performance in bytes/second for the reported algorithm.

In another embodiment, the invention provides a mailing system that includes a network, and a plurality of postage metering systems operatively coupled to the network, wherein each of the postage metering systems has a postal security device and wherein the postal security device of at least a first one of the postage metering systems is adapted to perform the various embodiments of the method described above.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 2A is a representation of exemplary raw hex data that may be contained in a Data Matrix barcode;

FIG. 2B is a schematic representation of human readable data to which the hex data shown in FIG. 2A maps;

FIG. 2C is a schematic representation of a digital signature of the raw hex data shown in FIG. 2A;

FIG. 3 is a schematic representation of a request for abilities data packet according to an aspect of the invention;

FIG. 4 is a schematic representation of a request for abilities response data packet according to a further aspect of the invention;

FIG. 5 is a schematic representation of a request for abilities table according to a further aspect of the invention;

FIG. 6 is a schematic representation of a distributed crypto request data packet according to a further aspect of the invention;

FIG. 7 is a schematic representation of one embodiment of a distributed crypto request response data packet according to an aspect of the invention;

FIG. 8 is a schematic representation of another embodiment of a distributed crypto request response data packet according to an aspect of the invention;

DESCRIPTION OF THE PREFERRED EMBODIMENTS

Figure 1:
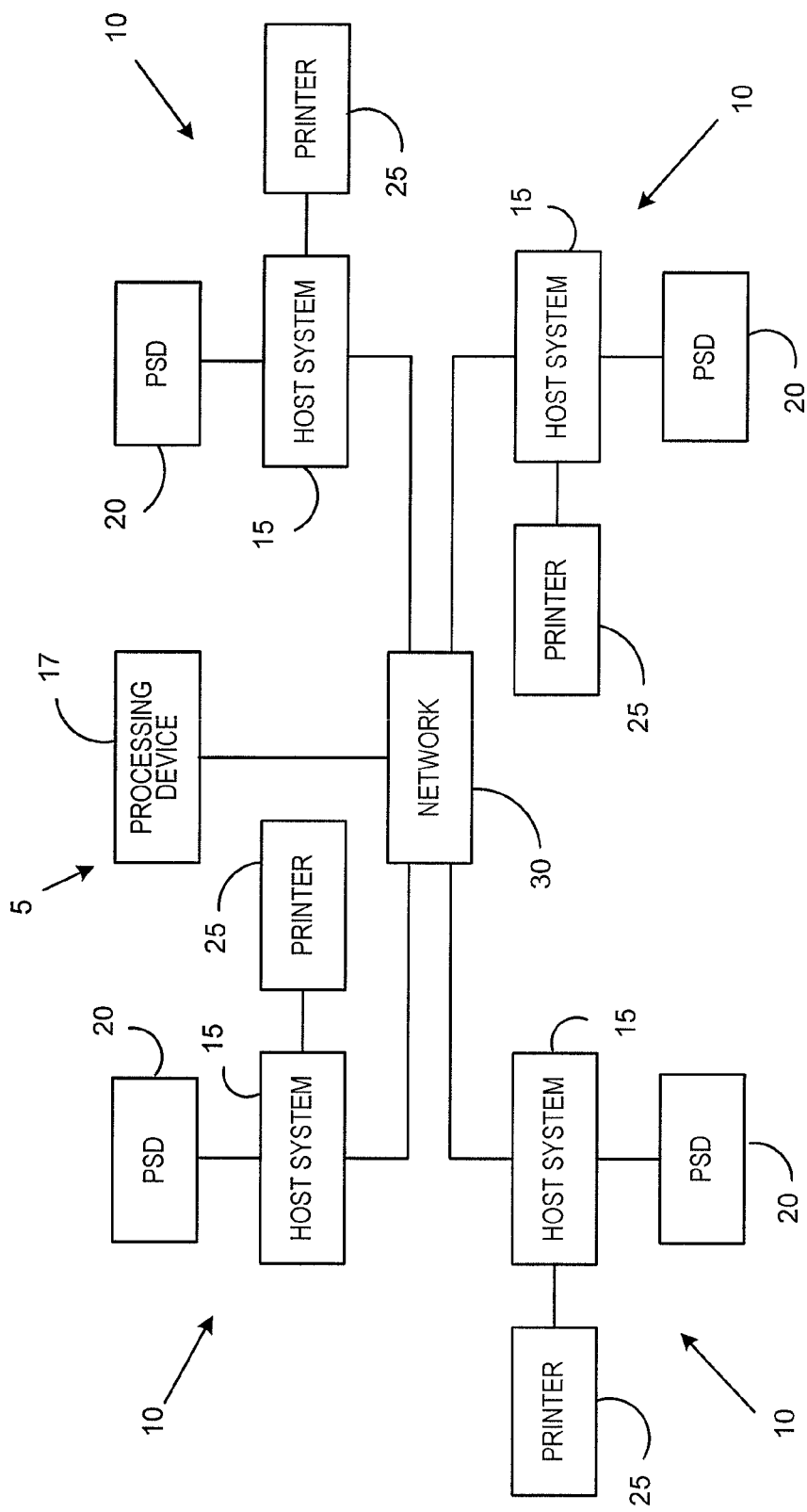
FIG. 1 is a block diagram of a networked mail processing system according to an embodiment of the present invention.

FIG. 1 is a block diagram of a networked mail processing system 5 according to one embodiment of the present invention. The networked mail processing system 5 includes a plurality of postage metering systems 10 that are each operatively coupled to a network 30, such as, for example and without limitation, a local area network (LAN) or a wide area network (WAN). Although four postage metering systems 10 are shown in FIG. 1, it should be understood that that is for illustrative purposes only, and that any number of postage metering systems 10 coupled to the network 30 may be employed. The networked mail processing system 5 may also optionally include one or more processing devices 17, comprising a secure special or general purpose processor. As seen in FIG. 1, each postage metering system 10 includes a host system 15, a PSD 20 operatively coupled to the host system 15, and a printer 25 operatively coupled to the host system 15. The postage metering systems 10 may be, for example and without limitation, a standalone postage meter or a postage meter forming a part of a mailing machine, or a PC-based metering system where the host system 15 comprises a personal computer. As described elsewhere herein, each PSD 20 is a secure processor-based accounting device that dispenses and accounts for postage value stored therein. In addition, each PSD 20 is provided with a cryptographic engine and memory for storing one or more cryptographic keys in order to encrypt messages and/or generate digital signatures using one or more predetermined cryptographic algorithms stored therein. Each processing device 17 need not include the ability to dispense and account for postage value, but instead need only be provided with a cryptographic engine and memory for storing one or more cryptographic keys in order to encrypt messages and/or generate digital signatures using one or more predetermined cryptographic algorithms stored therein. The cryptographic algorithms stored by each PSD 20 and processing device 17 and the processing capabilities and/or processing speeds thereof may vary widely.

In the networked mail processing system 5, each PSD 20 is provided with the ability to selectively offload the performance of one or more cryptographic operations required for generating postal indicia to selected other ones of the PSDs 20 or processing devices 17 in the manner described elsewhere herein, while still performing the accounting functions locally. As a result, a particular PSD 20 that is not capable of performing a particular cryptographic operation may offload the performance of that operation to another one of the PSDs 20 or processing devices 17 that is provided with that capability. In addition, a particular PSD 20 that is capable of performing a particular cryptographic operation may nonetheless still offload the performance of that cryptographic operation to another one of the PSDs 20 or processing devices 17 that is able to do so in a faster, more efficient manner. As will be appreciated, the functionality just described will result in greater overall throughput in the networked mail processing system 5, especially in situations wherein the networked mail processing system 5 includes a collection of varied hardware.

For example, as is known, indicia that are printed on pieces of United States mail may include a Data Matrix barcode therein. A typical Data Matrix barcode can contain 89 bytes of data, on which a DSA (Digital Signature Algorithm) signature value needs to be computed. FIG. 2A shows an example of the raw hex data in a typical Data Matrix barcode that would need to be digitally signed. FIG. 2B shows the human readable values to which the data shown in FIG. 2A maps. Finally, FIG. 2C shows the DSA signature that would need to be generated on the raw data shown in FIG. 2A. As seen in FIG. 2C, the DSA signature is 40 bytes in the length. If the network 30 shown in FIG. 1 were able to employ a gigabit Ethernet connection capable of a theoretical maximum of 125 megabytes per second, it will be understood that an 8-bit byte would take eight nanoseconds to send. Thus, sending a request including 89 bytes of data would require 712 nanoseconds and sending a response of 40 bytes of data would require 220 nanoseconds, thereby causing the network overhead to be 1,032 nanoseconds, or 1.032 milliseconds. Since current DSA implementations take longer than this to compute a signature, one can conclude that for many situations, allowing another PSD 20 or processing device 17 in the network mail processing system 5 to perform a cryptographic operation will often result in greater throughput.

In order to implement the invention in, for example, the embodiment shown in FIG. 1, each PSD 20 and processing device 17 will need to be provided with functionality (i.e., through software provided therewith) that enables it to send several specific data packets for optimizing the performance of cryptographic operations. Those data packets, and in particular each of the fields forming a part of those data packets, are described in connection with FIGS. 3 through 8.

FIG. 3 shows a request for abilities data packet 35 that enables each PSD 20 to request information relating to the performance capabilities of any other PSD 20 or processing device 17 that is operatively coupled to the network 30. The request for abilities data packet 35 includes a source IP address 40 which identifies the IP address of the particular PSD 20 sending the request for abilities data packet 35 and a digital signature 45. The source IP address 40 will be used by each recipient PSD 20 and processing device 17 so that it will know where to send its response (described elsewhere herein). In addition, the source IP address 40 may also be verified by each PSD 20 and processing device 17 against a stored known set of IP addresses to make sure that the requesting PSD 20 is legitimate. The digital signature 45 will be verified by each receiving PSD 20 and processing device 17 to make sure that the request for abilities data packet 35 came from a legitimate source. It is assumed that for this and all subsequent data packets described herein that include a digital signature that the key or keys used to create the digital signature will have previously been loaded onto all PSDs 20 and processing devices 17 that are operatively coupled to the network 30 in the networked mail processing system 5.

FIG. 4 is a schematic representation of a request for abilities response data packet 50. Each PSD 20 and processing device 17 that receives the request for abilities data packet 35 shown in FIG. 3 will respond with a request for abilities response data packet 50 as shown in FIG. 4. The request for abilities response data packet 50 includes a source IP address 55 which identifies the particular PSD 20 or processing device 17 sending the request for abilities response data packet 50, a destination IP address 60, a number of algorithms 65, for each algorithm an algorithm identifier (name/type) 70, an algorithm strength 75, and an algorithm performance 80, and a digital signature 85. The source IP address 55 will be used by the requesting/receiving PSD 20 (i.e., the one that sent the request for abilities data packet 35) for subsequent requests to the responding PSD 20 or processing device 17. In addition, the source IP address 55 can also be verified against a known set of addresses to make sure that the responding PSD 20 or processing device 17 is legitimate. The destination IP address 60 can be used by the requesting/receiving PSD 20 to verify that the request for abilities response data packet 50 is intended for that PSD 20. The number of algorithms 65 indicates the number of cryptographic algorithms that are supported by the particular PSD 20 or processing device 17 and is needed since the number of algorithms supported by each PSD 20 or processing device 17 will vary. The recipient PSD 20 of the request for abilities response data packet 50 will need to know the number of algorithms so that it can properly parse the remainder of the request for abilities data packet 50, which will, as will be appreciated, be variable in size. For each reported algorithm, the algorithm identifier 70 will identify the name/type of the algorithm (e.g., DES, AES, ECDSA), the algorithm strength 75 will identify the bit strength of the algorithm, and the algorithm performance 80 will identify the performance of the algorithm in bytes per second (for that specific algorithm and bit strength). In addition, the request for abilities response data packet 50 may also include the process load, in percent, for the last time that a request for an operation using that algorithm was made. Finally, the digital signature 85 is a digital signature of the data that is included in the request for abilities response data packet 50.

Once the requesting/receiving PSD 20 (i.e., the one that transmitted the request for abilities data packet 35) has collected all of the responses (all of the request for abilities responses 50) from each PSD 20 and processing device 17, it can than build a request for abilities table 90 as shown in FIG. 5 and store that table in memory. As seen in FIG. 5, the request for abilities table 90 will include for each responding PSD 20 and processing device 17 identified by a particular IP address 55 the algorithm type 70, the algorithm strength 75, the algorithm performance 80, and preferably the process load as described above. Furthermore, a PSD 20 may send out additional requests for abilities data packet 35 at future times, as additional PSDs 20 and/or processing devices 17 may have been added to or certain PSDs 20 and/or processing devices 17 may have been removed from the networked mail processing system 5 since the time of the last request. Preferably, this is done periodically to ensure that the request for abilities table 90 is relatively up to date.

In accordance with an aspect of the present invention, when a PSD 20 needs to perform a cryptographic operation associated with generating a postal indicium on a piece of data, it will check the request for abilities table 90 that it has created and stored as described above. Since the request for abilities table 90 contains performance data for both the PSD 20 itself as well as the other PSDs 20 and processing devices 17 in the networked mail processing system 5, the PSD 20 in question may determine that it is the fastest provider of the required cryptographic operation, in which case the operation will be performed locally by the PSD 20. However, if one of the other PSDs 20 or processing devices 17 is, as determined by analyzing the request for abilities table 90, able to perform the required cryptographic operation in less time than the PSD 20 itself, a distributed crypto request data packet 95 as shown in FIG. 6 will be generated and sent to the PSD 20 or processing device 17 that is determined to be the fastest provider. Depending on the particular cryptographic operation to be performed, the key required for that operation may only be contained in the originating PSD 20. In this case, the key needs to be sent as part of the distributed crypto request data packet 95. If the key is included in the distributed crypto request 95, the distributed crypto request data packet 95 needs to be encrypted with a key or keys that are common to both the sending PSD 20 and the receiving PSD 20 or processing device 17.

As seen in FIG. 6, the distributed crypto request data packet 95 includes a source IP address 100 which provides the IP address of the PSD 20 sending the distributed crypto request data packet 95, a destination IP address 105, which is the IP address of the PSD 20 or processing device 17 to which the distributed crypto request 95 is being sent, an algorithm type 110, an algorithm strength 115, a key ID 120, a key length 125, key data 130, data length 135, data 140 and a digital signature 145. The source IP address 100 may, as described elsewhere herein, be verified against a known set of source IP addresses to make sure that the PSD 20 sending the distributed crypto request 95 is legitimate. The destination IP address 105 may be used by the PSD 20 or processing device 17 that receives the distributed crypto request data packet 95 to verify that the message was intended for it. The algorithm type 110 and the algorithm strength 115 are taken from the request for abilities table 90 that was previously generated by the sending PSD 20 and is used to identify the algorithm to be used for the requested cryptographic operation. The key ID 120 will include an identifier to determine what key should be used to perform the requested cryptographic operation. The key length 125 contains the length of the key needed to perform the cryptographic operation. If no key data needs to be sent with the distributed crypto request data packet 95, the value of this field will be zero. The key data 130 will, if the key length 125 is greater than zero, contain the key required to perform the requested cryptographic operation. The data length 135 is the length of the data to which the cryptographic operation will be applied. The data 140 is the data on which the cryptographic operation is to be performed. The digital signature 145 is a digital signature of the data that is included in the distributed crypto request data packet 95 described above.

If the PSD 20 or processing device 17 that receives the distributed crypto request data packet 95 is unable to service the request, it will send a distributed crypto request response 150 as shown in FIG. 7. As seen in FIG. 7, the distributed crypto request response 150 includes a status 155 that indicates a failure code. In such a case, the sending PSD 20 will either try to send a distributed crypto request data packet 95 to the next most capable PSD 20 or processing device 17 (as identified from the request for abilities table 90), or, if too much time has passed to make a remote operation beneficial, the PSD 20 will, if capable, perform the operation locally.

If, however, the PSD 20 or processing device 17 receiving the distributed crypto request data packet 95 is able to service the request, it will generate and send to the requested PSD 20 a distributed crypto request response data packet 160 as shown in FIG. 8. The distributed crypto request response data packet 160 includes a status 165 that indicates that a successful operation has been performed, a source IP address 170 that identifies the IP address of the PSD 20 or processing device 17 sending the distributed crypto request response data packet 160, and a destination IP address 175 which identifies the PSD 20 that is to receive the distributed crypto request response data packet 160. The distributed crypto request response data packet 160 also includes an algorithm type 180, an algorithm strength 185, a processed data length 190, processed data 195, and a process load 200. The algorithm type 180 and the algorithm strength 185 identify the algorithm that was used to service the request and may be used to match the distributed crypto request response data packet 160 with the original distributed crypto request data packet 95. The processed data length 190 identifies the length of the processed data 195, and the processed data 195 contains the result of the requested cryptographic operation. The process load 200 is used to update the request for abilities table 90 that is stored by the requesting PSD 20 so that subsequent requests, with all of the factors being equal, can be sent to the PSD 20 or processing device 17 with the smallest load.

Figure 9:
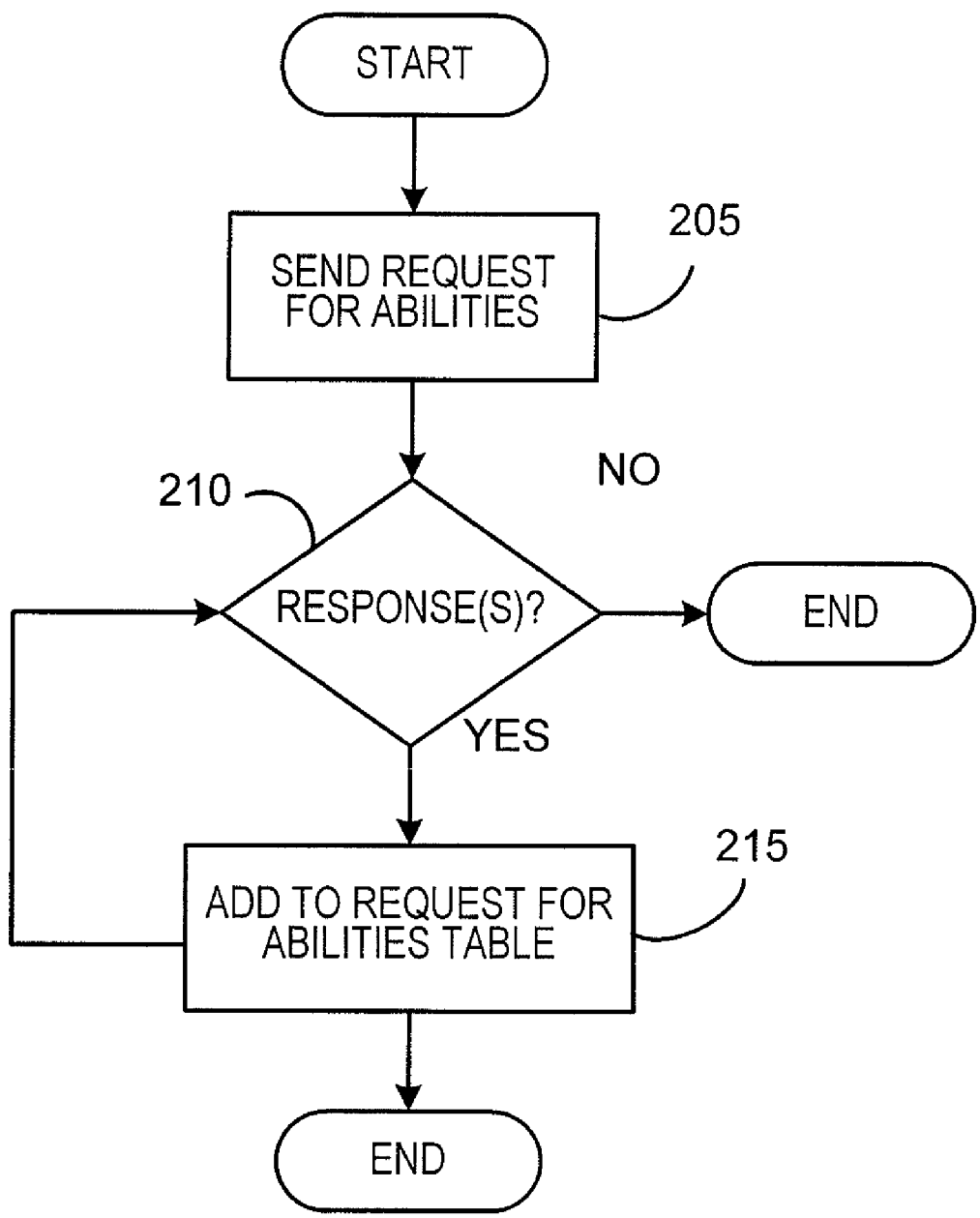
FIG. 9 is a flowchart illustrating a method of generating a request for abilities table according to an embodiment of the invention.

FIG. 9 is a flowchart illustrating a method of generating the request for abilities table 90 shown in FIG. 5 according to an aspect of the present invention. The method begins at step 205, wherein the PSD 20 that is generating the request for abilities table 90 generates and sends a request for abilities data packet 35 as shown in FIG. 3 to each of the other PSDs 20 and processing devices 17 forming a part of the networked mail processing system 5. As described elsewhere herein, those other PSDs 20 and processing devices 17 will generate and send to the requesting PSD 20 a request for abilities response data packet 50 as shown in FIG. 4. At step 210, the PSD 20 that generated the request for abilities table 90 determines whether there are request for abilities response data packets 50 that it has yet to process. If the answer is yes, meaning there are more to process, then, at step 215, the appropriate data is extracted from the next request for abilities response data packet 50 and is added to the request for abilities table 90. Then, the method returns to step 210. If, however, the answer at step 210 is no, meaning that all of the request for abilities response data packets 50 have been processed, then the method ends as the request for abilities table 90 will have been completed.

Figure 10:
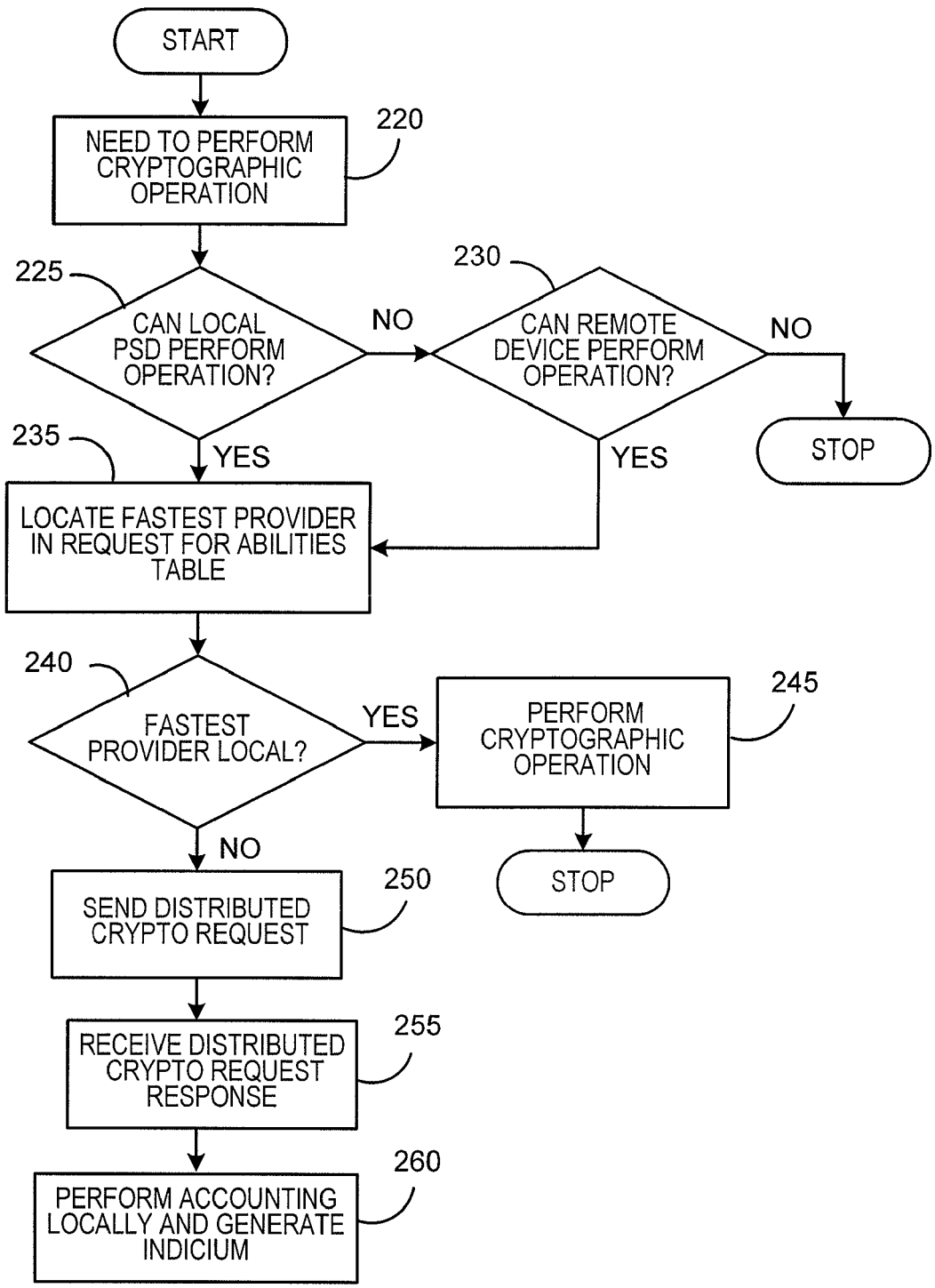
FIG. 10 is flowchart illustrating a method of having a cryptographic operation performed on desired data according to an embodiment of the invention.

FIG. 10 is a flowchart illustrating a method of having a desired cryptographic operation performed on a piece of data according to an aspect of the present invention. The process begins at step 220, wherein a particular PSD 20 determines that in conjunction with generating a postal indicium that evidences payment of postage, it needs to perform a cryptographic operation on a piece of data. Such data could include, for example, data typically included in postal indicia, e.g., values of one or more registers maintained by the particular PSD 20, amount of postage, date, serial number of the particular PSD 20, etc. Next, at step 225, the PSD 20 determines whether or not it can perform the required cryptographic operation. If the answer at step 225 is no, then the PSD 20 consults the request for abilities table 90 that it has created and stored as described herein to determine whether any of the other devices in the networked mail processing system 5, e.g., other PSDs 20 (remote PSDs) or processing devices 17, are able to perform the required cryptographic operation. If the answer at step 230 is no, then the method ends as no device in the networked mail processing system 5 is able to perform the requested operation.

If the answer at either step 225 or step 230 is yes, then the method proceeds to step 235. At step 235, the PSD 20 that needs to have the cryptographic operation performed (the local PSD 20) consults the request for abilities table 90 that it has stored to identify which device (including itself) forming a part of the network mail processing system 5 is the fastest provider of the needed cryptographic operation. At step 240, a determination is made as to whether that fastest provider is the local PSD 20. If the answer at step 240 is yes, than the local PSD 20 performs the cryptographic operation and the method ends. If, however, the answer at step 240 is no, then in step 250 the local PSD 20 generates an appropriate distributed crypto request data packet 95 as shown in FIG. 6 and transmits that distributed crypto request data packet 95 to the PSD 20 or processing device 17 determined in step 235 to be the fastest provider. Then, that PSD 20 or processing device 17 performs the requested cryptographic operation and generates an appropriate distributed crypto request response data packet 160 as shown in FIG. 8 and transmits it to the requesting PSD 20. In an alternative embodiment, it may already be predetermined that an identified device on the network 40 can perform the cryptographic operation faster than the PSD 20, and the PSD 20 will automatically identify the device and generate an appropriate distributed crypto request data packet 95 as shown in FIG. 6 and transmit that distributed crypto request data packet 95 to the predetermined device. If this occurs, it should be understood that steps 225-245 need not be performed. At step 255, the local requesting PSD 20 receives the distributed crypto request response data packet 160 and extracts the processed data 195 therefrom, which processed data is the data needed by the PSD 20 for further operation. In step 260, the local requesting PSD 20 performs the accounting required for the indicium, utilizing the registers maintained within the local requesting PSD 20, and uses the processed data extracted in step 255 to complete the generation of the indicium.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of generating a postal indicium to evidence payment of postage in a postage metering system coupled to a network, the method comprising:

determining in the postage metering system that a cryptographic operation associated with generating the postal indicium needs to be performed on a piece of data;

identifying a device coupled to the network that can perform the cryptographic operation on the piece of data faster than the postage metering system can perform the cryptographic operation on the piece of data;

sending a request through the network to the identified device to perform the cryptographic operation on the piece of data, the request including at least the piece of data;

receiving a response including processed data in the postage metering system through the network from the device, the processed data including a result of the cryptographic operation being performed on the piece of data;

accounting for the postal indicium in the postage metering system; and using the processed data to complete the postal indicium.

2. The method according to claim 1, wherein identifying a device further comprises:

determining if a device coupled to the network other than the postage metering system can perform the cryptographic operation on the piece of data faster than the postage metering system based on performance capabilities of the device.

3. The method according to claim 1, wherein if it is determined that no device coupled to the network other than the postage metering system can perform the cryptographic operation on the piece of data faster than the postage metering system, the method further comprises:

performing the cryptographic operation on the piece of data using the postage metering system.

4. The method according to claim 1, wherein the device is predetermined and a request is sent from the postage metering system to the device to perform all cryptographic operations for the postage metering system.

5. The method according to claim 1, wherein the identified device is determined to have a process load that is smaller than a process load of any other devices coupled to the network that can perform the cryptographic operation on the piece of data faster than the postage metering system can perform the cryptographic operation on the piece of data.

6. The method according to claim 1, further comprising requesting and receiving, through the network, at the postage metering system information relating to performance capabilities of all devices coupled to the network and storing the information, wherein identifying a device that can perform the cryptographic operation on the piece of data faster than the postage metering system includes using the stored information.

7. The method according to claim 6, wherein storing the information includes generating and storing a table, the table including for each device the information relating to the performance capabilities of the device and a corresponding identifier for the device, the table further including information relating to the performance capabilities of the postage metering system, and wherein identifying a device that can perform the cryptographic operation on the piece of data faster than the postage metering system includes consulting said table.

8. The method according to claim 6, wherein the information relating to the performance capabilities of each device other than the postage metering system includes, for each device, algorithm information relating to one or more reported algorithms supported by the device.

9. The method according to claim 8, wherein the algorithm information for each of the one or more reported algorithms includes a name of the reported algorithm, a bit strength of the reported algorithm, and a performance in bytes/second for the reported algorithm.

10. The method according to claim 1, wherein the request further includes at least one key for use in performing the cryptographic operation.

11. The method according to claim 1, further comprising encrypting the request in a manner wherein the encrypted request can be decrypted using one or more stored keys stored by the identified device.

12. The method according to claim 1, wherein the request further includes an identification of an algorithm and an algorithm strength to be used in performing the cryptographic operation.

13. The method according to claim 1, wherein the identified device is a second postage metering system coupled to the network.

14. The method according to claim 1, wherein the identified device is a processing device coupled to the network.

15. A mailing system, comprising:

a network having a plurality of devices coupled thereto; and a first postage metering system operatively coupled to the network;

wherein the first postage metering system is adapted to:

determine that a cryptographic operation associated with generating a postal indicium needs to be performed on a piece of data;

identify a device coupled to the network that can perform the cryptographic operation on the piece of data faster than the first postage metering system can perform the cryptographic operation on the piece of data;

send a request through the network to the identified device to perform the cryptographic operation on the piece of data, the request including at least the piece of data;

receive a response including processed data through the network from the device, the processed data including a result of the cryptographic operation being performed on the piece of data;

account for the postal indicium in the first postage metering system; and use the processed data to complete the postal indicium.

16. The mailing system according to claim 15, wherein the plurality of devices coupled to the network includes a second postage metering system.

17. The mailing system according to claim 16, wherein the plurality of devices coupled to the network includes a processing device.

18. The mailing system according to claim 15, wherein the first postage metering system is further adapted to:

determine if a device coupled to the network other than the postage metering system can perform the cryptographic operation on the piece of data faster than the postage metering system based on performance capabilities of the device.

19. The mailing system according to claim 18, wherein if it is determined that no device coupled to the network other than the postage metering system can perform the cryptographic operation on the piece of data faster than the first postage metering system is further adapted to perform the cryptographic operation on the piece of data.

20. The mailing system according to claim 15, wherein the device is predetermined and the first postage metering system is adapted to send a request to the device to perform all cryptographic operations for the first postage metering system.

21. The mailing system according to claim 15, wherein the first one of the postage metering system is further adapted to request and receive through the network information relating to performance capabilities of each of the plurality of devices coupled to the network and to store the information, wherein the identification of a device that can perform the cryptographic operation on the piece of data faster than the first postage metering system is based on the stored information.

* * * * *